United States Patent [19]

Kaseta

[11] 4,438,380

[45] Mar. 20, 1984

[54] STEPPING MOTOR EXCITATION CIRCUITRY

[75] Inventor: Robert G. Kaseta, Stow, Mass.

[73] Assignee: Data General Corporation, Westboro, Mass.

[21] Appl. No.: 219,512

[22] Filed: Dec. 23, 1980

Related U.S. Application Data

[63] Continuation of Ser. No. 917,564, Jun. 21, 1978, abandoned.

[51] Int. Cl.³ .............................................. G05B 19/40
[52] U.S. Cl. ................................... 318/696; 318/685; 307/297; 307/296 R; 323/315
[58] Field of Search ................ 318/685, 696; 323/315, 323/272, 282; 360/77, 78

[56] References Cited

U.S. PATENT DOCUMENTS

| | | | |
|---|---|---|---|
| 3,449,735 | 6/1969 | Cogar | 340/174.1 |
| 3,649,753 | 3/1972 | Kinjo et al. | 178/6.6 DD |
| 3,681,525 | 8/1972 | Wada et al. | 178/6.6 DD |
| 3,789,378 | 1/1974 | Bonzano et al. | 340/174.1 C |
| 3,842,331 | 10/1974 | Hendrickson et al. | 318/685 |
| 3,956,766 | 5/1976 | Hanson et al. | 360/78 |
| 3,974,434 | 8/1976 | Yablonski | 318/696 |
| 4,145,644 | 3/1979 | Liu | 318/696 |
| 4,157,577 | 6/1979 | Porter, Jr. et al. | 360/77 |

OTHER PUBLICATIONS

Kessel et al., "Integrated Linear Basic Circuits" Philips Technical Review, vol. 32, No. 1, 1971, pp. 1–12.
The New Penguin Dictionary of Electronics, Valeric Pitt Editor 1981, p. 83, item: Constant-Current Source.
Dictionary of Scientific & Technical Terms.
Oleksky, J. E., Practical Solid-State Circuit Design, H. W. Sanns & Co. 1974.
Solid–State Devices Manual, RCA Corporation 1975.
Connelly J. A. Analog Integrated Circuits, J. Wiley & Sons, 1975.
Step Motor Drive Circuitry and Open Loop Control, J. Maginot and W. Oliver in Proceedings Third Annual Symposium on Incremental Motion Control Systems and Devices, B. C. Kuo, Editor 1974.

*Primary Examiner*—J. V. Truhe
*Assistant Examiner*—Saul M. Bergmann
*Attorney, Agent, or Firm*—Robert F. O'Connell

[57] ABSTRACT

Circuitry for driving stepping motor coils through a sequence of discrete steps, each winding of the stepping motor having drive circuitry which includes a first, low power circuit, having a regulated power supply, for supplying a substantially constant voltage and a second, high power circuit having a transistor constant current circuit, the substantially constant voltage being supplied to the base thereof. The second circuit can use a substantially unregulated power supply, the voltage of which may vary considerably. Such second circuit, however, supplies a substantially constant current pulse to its associated stepping motor winding even if the unregulated power supply voltage varies over a relatively wide range. The same circuitry configuration is used for each winding so that the current pulses supplied to each winding are substantially the same even if the winding resistances differ from winding to winding. Such circuitry is extremely effective when used for positioning the read/write heads of a disk storage device in a data processing system wherein rapid and accurate positioning of such heads relative to the disk surface is required. The heads can be controlled to move in a manner which permits them to be stopped at a desired position substantially at zero velocity so that little or no oscillation thereof occurs.

4 Claims, 6 Drawing Figures

STEPPING MOTOR EXCITATION CIRCUITRY

This is a continuation of application Ser. No. 917,564 filed June 21, 1978, now abandoned.

INTRODUCTION

This invention relates generally to stepping motor circuitry and, more particularly, to circuits for providing high current pulses to stepping motor coils utilizing a relatively unregulated power source.

BACKGROUND OF THE INVENTION

Stepping motors which rotate a shaft through a predetermined angle upon the application of a set of coded pulses of current to the motor coils, or windings, find use in many fields where positive, accurate, discrete movements reliably responsive to relatively high frequency pulses are desired. In a four-phase stepping motor, for example, appropriately coded combinations of four current pulses are supplied simultaneously to each of four stepping motor coils so that the stepping motor moves in sequence from one position to the next through a preselected angle. Thus, in a four-phase stepping motor the angle may be 1.8° and coded pulse sequences are repetitively arranged to provide 200 discrete steps for a complete 360° shaft rotation. Other embodiments may provide for different sequences of coded pulses for producing 400 discrete steps of 0.9° each. The techniques for generating such pulse code sequences and for applying them to the coils of the stepping motor are well known to those in the art, the motor being capable of moving through its stepping sequence in either direction of rotation.

One of the problems in such conventional stepping motor pulse excitation circuitry lies in the need for a relatively expensive and highly regulated power supply, the high current pulses requiring the generation of relatively high power. Since such high current, high power pulses must each have a substantially constant magnitude, independently of any voltage variations in the power supply, such power supply must be highly regulated. Because of the high power requirements the cost thereof becomes more than is often justified in the particular application in which the stepping motor is to be used.

It is desirable, therefore, that the pulse excitation circuitry for a stepping motor be arranged so that the power supply for the circuit portion which supplies the high current pulses to the windings be essentially unregulated, or have low regulation, even at the high powers required.

BRIEF SUMMARY OF THE INVENTION

In accordance with the invention each stepping motor coil excitation circuit comprises a first section which produces a substantially constant voltage at relatively low power utilizing a regulated power source. The substantially constant voltage is supplied to a second section comprising an transistor constant current circuit of a high current, high power output circuit for supplying current pulses to the associated stepping motor coil. The high current, high power circuit utilizes a power supply which is essentially unregulated. Because the base voltage at the transistor constant current circuit is held substantially constant at the output of the low power circuit section, variations in the power supply voltage for the high power circuit section do not affect the current pulse output supplied to the coil. Because a regulated power supply is utilized only in the low power circuit, such supply is considerably less expensive than regulated power supplies required for higher power circuits. Further, since the power supply for the high power circuit is substantially unregulated, such power supply is also relatively low in cost. Accordingly, the overall cost of each excitation circuit is reduced from that required by the prior art.

One application for the use of such stepping motors is in the field of data processing systems which utilize disk storage units, for example. In such units it is desirable that the read/write heads thereof be moved to different positions relative to the disk surface. Such positioning of the heads must be performed rapidly to assure fast access time to the information stored on the disk and accurately to assure that the correct information is being read from or written onto the disk surface.

Normally such position is achieved by the use of servo-controlled solenoid devices requiring relatively expensive elements such as sensor transducers and multi-element feedback loops, all of which increase the cost thereof and reduce the reliability of the positioning system. In accordance with the invention, reduced costs and high reliability are achieved by utilizing stepping motors for such purpose. Prior to the invention, there has been no use made of stepping motors in a disk drive system context and, because of the need for highly accurate positioning with respect to disks having relatively high data densities, such technique has generally not been considered as reasonably feasible. However, in view of the ability of the stepping motor excitation circuitry to achieve rapid movement of the stepping motor shaft from one position to another in an accurate and repeatable manner, it is now found that stepping motors can be reliably used in disk drive systems.

Further the application of the stepping motor excitation current can be arranged so as to provide for effective electrical damping of the system to reduce the oscillation of the read/write heads when the desired position relative to the disk surface has been reached.

DESCRIPTION OF THE INVENTION

The invention can be described in more detail with the help of the accompanying drawings wherein.

Figure 1:
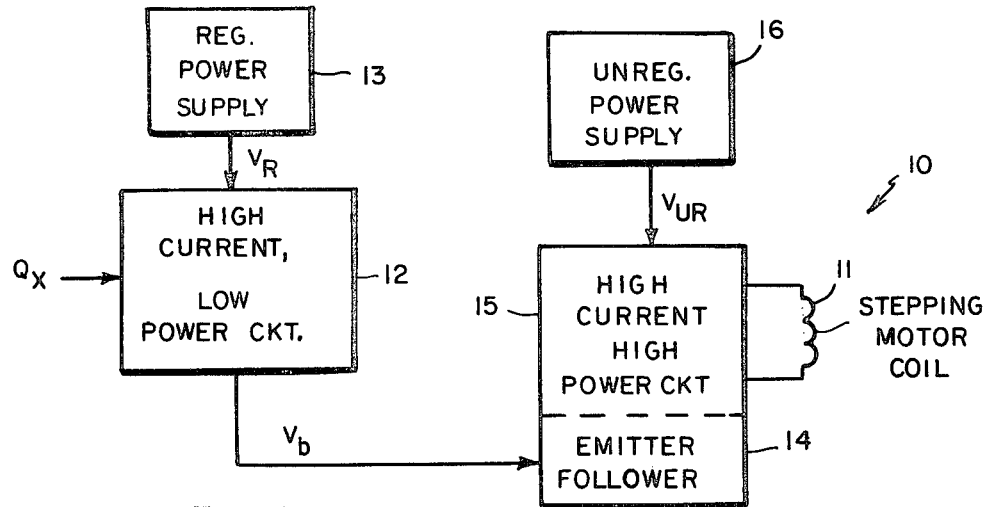
FIG. 1 shows a block diagram of a stepping motor system using a preferred embodiment of the invention.
Figure 2:
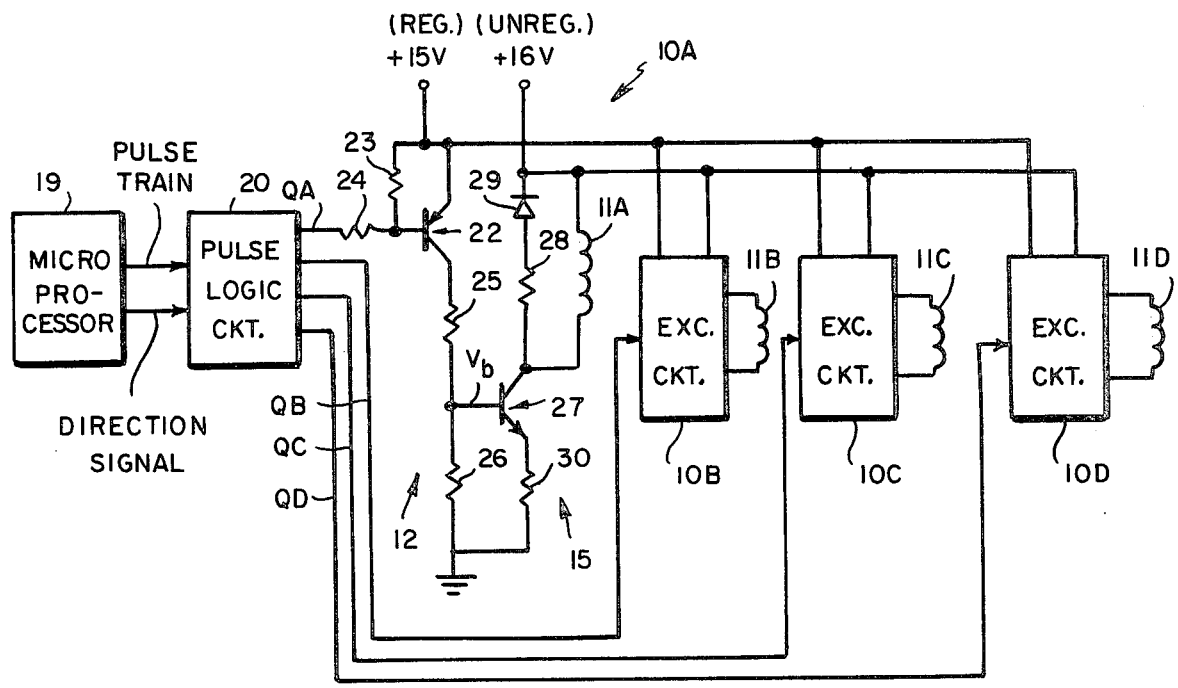
FIG. 2 shows a more detailed partial block diagram, partial schematic diagram of the invention shown in FIG. 1.

As can be seen in FIG. 1, an excitation circuit 10 for supplying a current pulse to a stepping motor coil 11 has supplied at its input a pulse indentified as "QX". For a four-phase stepping motor, four of such excitation circuits are utilized, one associated with each of four stepping motor coils, the input pulses to each of the circuits being specifically identified as QA, QB, QC, and QD (FIG. 2). The excitation circuit of FIG. 1 is representative of each of the excitation circuits for each of the stepping motor coils of the stepping motor. The input pulse is supplied to a high current, low power circuit 12 which is powered by a voltage $V_R$ obtained from a regulated power supply 13. Circuit 12 provides a base voltage $V_b$ to the base of an transistor 14 which is used in a high current, high power circuit 15 which supplies the current pulse for stepping motor coil 11. Circuit 15 is powered by a voltage $V_{UR}$ from an unregulated power supply 16.

Because circuit 12, which supplies the substantially constant voltage $V_b$, is a low power circuit, the regulated power supply 13 utilized to supply voltage $V_R$ can be a relatively inexpensive one. Since the base voltage $V_b$ of transistor 14 is held substantially constant the high power circuit 15 can provide a substantially constant current pulse to stepping motor coil 11 independently of variations in the voltage $V_{UR}$. Accordingly, a relatively inexpensive, substantially unregulated power supply can be utilized for the high power circuit.

The excitation circuitry 10 of FIG. 1 can be seen in more detail in FIG. 2. In the latter figure each of the coils 11A, 11B, 11C, and 11D of a four-phase stepping motor, for example, utilizes an excitation circuit 10A, 10B, 10C, and 10D, respectively, of substantially the same configurations only one of which is depicted schematically.

Input pulses QA, QB, QC, and QD are supplied to each of such excitation circuits, respectively, and are obtained from suitable pulse logic circuitry 20. In a conventional stepping motor appropriately coded pulse combinations are supplied to the coils of the stepping motor, as is well known. Thus, for a four-phase stepping motor the following exemplary coded pulse combinations may be utilized for stepping the motor through its desired discrete 1.8° angular positions.

| QA | QB | QC | QD |
|----|----|----|----|
| 1  | 0  | 1  | 0  |
| 0  | 1  | 1  | 0  |
| 0  | 1  | 0  | 1  |
| 1  | 0  | 0  | 1  |

The input pulses QA-QD are either present (signified by "1") or absent (signified by "0") in the above sequence.

In accordance with well-known practice, the above sequence of coded pulse combinations is repeated so that the stepping motor shaft can be moved through a total of 200 steps per revolution. The generation of such sequence of coded pulse combinations is well known to those in the art. One technique, for example, as shown in FIG. 2, utilizes an appropriate pulse train, derived from a microprocessor 19, which pulse train is supplied to a suitable pulse logic circuit 20 for providing such pulses to permit the motor to be stepped through the abovedescribed sequence. The microprocessor, for example, can also supply an appropriate direction signal which controls the angular direction of rotation through which the stepping motor is to be moved.

When a pulse is present at the input to excitation circuits 10A-10D, each such circuit must supply a relatively high current pulse to its associated stepping motor coil (11A-11D), which pulse has a substantially constant magnitude so that accurate positioning of the stepping motor shaft will occur. Variations in such magnitude will produce inaccuracies in such positioning.

Because of the desire for such high accuracy, previously known excitation circuits utilize extremely highly regulated power supplies so that the voltage supplied to the excitation circuit remains substantially constant at the relatively high current (and high power) which is required for rapid stepping of the motor through its shaft angle positions. Such highly regulated power supplies are relatively expensive and increase the costs of the overall system in which such stepping motors are to be used.

The excitation circuit of FIG. 2 provides for such highly accurate positioning without the need for high power voltage regulators. As seen therein the input pulse is supplied to a low current, low power circuit 12 which comprises transistor 22 having a voltage supplied from a regulated power supply which, in a specific embodiment, for example, may provide a voltage of 15 volts. Such voltage is supplied directly to the emitter of transistor 22 and to the base thereof via resistor 23, the input pulse QA being supplied to the base through input resistor 24. An output voltage $V_b$ is supplied at the junction of collector resistors 25 and 26, both of which are precision resistors, and is supplied to the base of transistor 27 of a high current, high power circuit 15. Voltage is supplied to the collector of transistor 27 via motor coil 11A and from a substantially unregulated power supply which, for example, may supply a voltage of 16 volts. When transistor 22 is off, the network comprising resistance 25 and diode 29 is used to provide rapid removal of energy from the coil.

A high current pulse is supplied to stepping motor coil 11A in the collector circuit of transistor 27. Because low power circuit 12 always supplies a substantially constant, and precise, voltage $V_b$ at the base of transistor 27 in response to the presence of input pulse QA, a substantially constant output circuit pulse is supplied to stepping coil 11A even should the voltage from the unregulated power supply vary over a wide range (as much, for example, as 20% of its nominal voltage).

Circuit 12 is a relatively low power circuit, e.g., in a particular embodiment supplying about 0.02 amps at 15 volts so that the power supply therefor need be regulated only with respect to an average power of about 0.3 watts. On the other hand, the high power circuit 15 requires currents of about 2 amps at a nominal power supply voltage of 16 volts, i.e., a power in excess of 30 watts.

Since the voltage $V_b$ can be held substantially constant by the regulated low power circuit 12 and the base-to-emitter voltage $V_{be}$ of transistor 27 is substantially constant, the current through resistor 30, i.e., as determined by the expression: $(V_b - V_{be})/R_{30}$, remains substantially constant despite fluctuations in the unregulated power supply voltage.

It is also found that coil resistances among different windings may vary as much as 10% or more. Such variations will also normally tend to cause the current levels therethrough to vary in an undesirable manner. However, by using the circuitry of the invention such changes in coil characterics do not adversely affect the operation so that currents through different coils remain at substantially the same level.

Figure 3:
FIGS. 3 and 4 show in qualitative form an exemplary pulse train and velocity profile of the type used in the invention.
Figure 4:
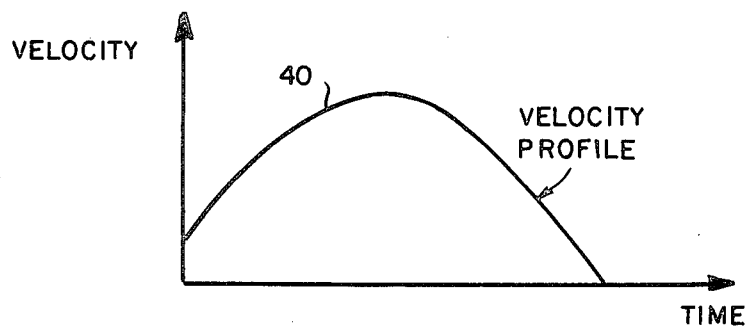

As mentioned above, in a specific embodiment of the invention it is desirable to move the stepping motor shaft in accordance with a preselected velocity profile, an exemplary velocity profile being shown qualitatively in FIG. 4 by curve 40. In order to move the stepping motor shaft in accordance therewith, a pulse train is supplied to the pulse logic circuit 20 of FIG. 2 in accordance with such velocity profile. An exemplary pulse train 41, shown qualitatively in FIG. 3, is produced in accordance with the velocity profile of FIG. 4. Thus, the distance between pulses of the pulse train input to pulse logic circuit 20 depends essentially upon the slope of the velocity profile curve. Each new input pulse received at pulse logic circuit 20 produces a particular coded combination of the output pulses QA–QD therefrom, such pulse code combinations changing in sequence as each new pulse is received. Such sequential change can be in accordance with the exemplary format shown above to produce 200 discrete 1.8° steps during a full 360° rotation of the motor shaft, for example.

The generation of a pulse train 41 in accordance with a selected velocity profile 40, for example, can be accomplished in various ways by those in the art and need not be described in further detail. The use of a microprocessor, for example, would be well known to the art for such purpose, although particular hard-wired logic circuitry may also be devised. Further, the design of pulse logic circuitry for the generation of the sequence of coded pulse combinations QA–QD in response to successive pulses of a pulse train input would also be well within the skill of the art and is not discussed in further detail here.

An effective use of the disk drive excitation circuitry utilizing a stepping motor as described above lies in the data processing field wherein such stepping motor can be used to position read/write heads of an appropriate storage system, such as a disk storage system. Such use can eliminate the requirement for relatively expensive servo-controlled head positioning systems even for disks having relatively high data density storage capabilities.

In accordance therewith the stepping motor is driven by the excitation circuitry described above utilizing a selected velocity profile such as shown in FIG. 4. The output shaft of the stepping motor is coupled to a head positioning mechanism in an appropriate manner, one such technique being shown and described in detail in co-pending U.S. Patent Application of Robert Kaseta et al., Ser. No. 899,046, filed Apr. 24, 1978 and incorporated herein by reference. The mechanical coupling shown in such co-pending application adequately depicts the manner in which such stepping motor can be utilized in a disk drive system and need not be described in further detail here.

In the use of such drive circuitry for moving read/write heads, it is desirable to move the heads in such a manner that they move rapidly to the desired position and arrive thereat with substantially little or no overshoot or oscillatory motion. Ideally, it is desired that the heads reach the desired position with substantially zero velocity.

Figure 5:
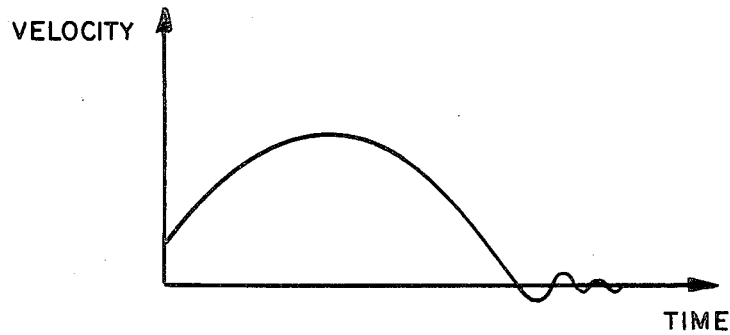
FIG. 5 shows a velocity profile of conventional prior art circuitry.
Figure 6:
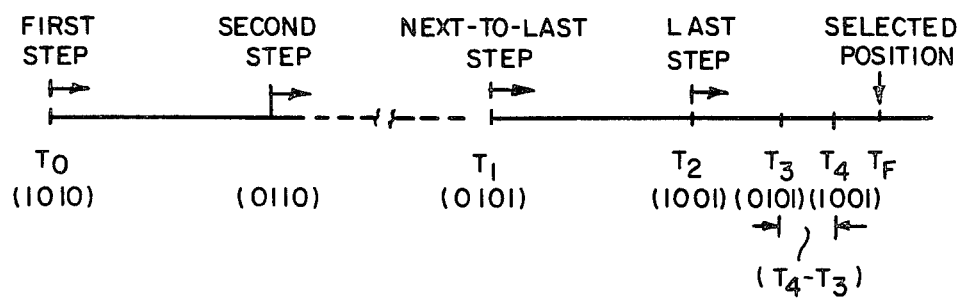
FIG. 6 shows a velocity profile utilized with the circuit of the invention for reducing the overall damping time in the operation of the circuit of the invention.

One such technique for achieving such performance can be described with the help of the graphical representations shown in FIGS. 5 and 6. As indicated above with reference to FIGS. 3 and 4, the stepping motor has a selected velocity profile and moves through its discreet steps accordingly. If no effective damping of the motion is used, either mechanical or electrical, the heads arrive at a non-zero velocity and will tend to oscillate about the desired position before settling thereat, as shown in FIG. 5.

In order to avoid such oscillation, it is found that effective damping of the velocity motion can be achieved as follows in the system described above. In moving from a first position to a second position, substantially the same velocity profile shape is used no matter what initial and final positions are involved. Accordingly, when the motion of the heads is initiated the microprocessor, from a knowledge of the initial and final positions and of such velocity profile shape, can be appropriately programmed to produce the desired motion. The stepping motion along such profile is achieved by using suitably selected sequential code combinations, as discussed above. At a selected time during the time period in which the stepping motor has applied the code combination representing the last step of its motion, such last code combination excitation is removed and the next-to-last code combination is applied for a selected time period. After the latter selected time period, the last code combination is again re-applied. By suitably selecting the time at which such code combinations are applied during the last step, the heads can be caused to arrive at the zero position with substantially little or near-zero velocity.

Assume, for example, that the next-to-last and last code combinations required to perform both the next-to-last and last steps of a desired positioning sequence are the code combinations "0101" and "1001", respectively, as set forth in the exemplary code combination sequence discussed above. Such a situation is shown diagrammatically in the timing diagram of FIG. 6 in which "0101" is applied at $T_1$ and "1001" is applied at $T_2$. At a selected time $T_3$, after application of the last code combination, the microprocessor is programmed to apply the next-to-last code combination for a selected time period until $T_4$, such time period being identified as $(T_4-T_3)$. At $T_4$ the last code combination is re-applied so that the heads arrive at the selected position with substantially zero velocity at time $T_F$.

The selections of time $T_3$ and time period $(T_4-T_3)$ can be determined empirically or can be suitably calculated from a knowledge of the velocity profile and the stepping motor characteristics being used. By the use of such damping technique, the oscillation present which would be normally present without damping can be reduced considerably. In a particular application, for example, it is found that the oscillation can be reduced from about 100 milliseconds to about 15 milliseconds.

What is claimed is:

1. A disk storage system having movable transducer means for writing data onto or reading data from a surface of one or more storage disks, said system comprising a stepping motor system for positioning said movable transducer means relative to a surface of said one or more storage disks, said stepping motor system comprising a stepping motor having a plurality of excitation windings capable of having current pulses supplied thereto for moving said stepping motor in discrete steps;

means coupling said stepping motor to said transducer means for moving said transducer means in discrete steps;

current drive circuits associated with each of said windings and responsive to an input driver signal for supplying current to its associated winding when said input driver signal is supplied thereto, each said current drive circuit including a first circuit including switching transistor means responsive to said input driver signal and having a pair of precision resistance means in the collector circuit thereof for supplying a substantially constant voltage at the junction of said precision resistors;

a regulated power supply means for supplying power to said first circuit;

a second circuit comprising a transistor circuit means having a substantially constant base-to-emitter voltage, said associated winding being placed in the collector circuit thereof and resistance means being placed in the emitter circuit thereof, said second circuit having substantially greater power requirements than those of said first circuit and being responsive to said substantially constant voltage for supplying a substantially constant current to said associated winding independently of the winding resistance when said driver input signal is supplied to said first circuit; and an unregulated power supply means for supplying power to said second circuit.

2. A disk storage system in accordance with claim 1 wherein said input driver signal and said current supplied to said excitation windings are pulse signals.

3. A disk storage system in accordance with claim 2 and further including logic means capable of supplying coded combinations of input driver signals to said current drive circuits.

4. A disk storage system in accordance with claim 3 and further including means for supplying a sequence of pulse signals to said logic means whereby said logic means provides a selected sequence of said coded combinations of input driver signals in response thereto.

* * * * *